United States Patent
Xu et al.

(10) Patent No.: US 11,507,278 B2
(45) Date of Patent: Nov. 22, 2022

(54) PROACTIVE COPY IN A STORAGE ENVIRONMENT

(71) Applicant: EMC IP Holding Company LLC, Hopkinton, MA (US)

(72) Inventors: Xinlei Xu, Beijing (CN); Jian Gao, Beijing (CN); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 59 days.

(21) Appl. No.: 16/579,993

(22) Filed: Sep. 24, 2019

(65) Prior Publication Data
US 2020/0133514 A1    Apr. 30, 2020

(30) Foreign Application Priority Data

Oct. 25, 2018 (CN) .......................... 201811251580.6

(51) Int. Cl.
| | | |
|---|---|---|
| G06F 12/00 | (2006.01) | |
| G06F 13/00 | (2006.01) | |
| G06F 3/06 | (2006.01) | |
| G06F 11/20 | (2006.01) | |

(52) U.S. Cl.
CPC ............ *G06F 3/0616* (2013.01); *G06F 3/064* (2013.01); *G06F 3/065* (2013.01); *G06F 3/0653* (2013.01); *G06F 3/0689* (2013.01); *G06F 11/2094* (2013.01)

(58) Field of Classification Search
CPC ........ G06F 3/0616; G06F 3/064; G06F 3/065; G06F 3/0653; G06F 3/0689; G06F 11/2094

USPC ......................................................... 711/154
See application file for complete search history.

(56) References Cited

U.S. PATENT DOCUMENTS

| | | | | |
|---|---|---|---|---|
| 5,717,917 A | * | 2/1998 | Munakata | G06F 16/958 |
| 7,181,578 B1 | * | 2/2007 | Guha | G06F 3/0631 |
| | | | | 711/E12.019 |
| 8,195,872 B2 | * | 6/2012 | Ito | G11C 16/349 |
| | | | | 711/115 |
| 8,479,080 B1 | * | 7/2013 | Shalvi | G06F 3/0688 |
| | | | | 714/766 |
| 9,122,588 B1 | * | 9/2015 | Mondal | G06F 12/1054 |
| 9,203,616 B1 | | 12/2015 | Brown et al. | |
| 9,652,160 B1 | * | 5/2017 | Piszczek | G06F 3/0616 |
| 9,959,054 B1 | | 5/2018 | Vankamamidi et al. | |
| 10,013,323 B1 | * | 7/2018 | Puhov | G06F 11/0727 |
| 10,013,325 B1 | * | 7/2018 | Garrett, Jr. | G06F 11/0793 |
| 10,082,965 B1 | * | 9/2018 | Tamilarasan | G06F 3/0616 |
| 10,146,449 B1 | * | 12/2018 | Labonte | G06F 3/0632 |
| 10,152,254 B1 | * | 12/2018 | Kang | G06F 3/0619 |

(Continued)

*Primary Examiner* — Sheng Jen Tsai
(74) *Attorney, Agent, or Firm* — BainwoodHuang (57) ABSTRACT

Techniques manage a Redundant Array of Independent Disks (RAID). In such a technique, in response to receiving information indicative of an end-of-life (EOF) of a first storage device of the RAID, a storage extent associated with the first storage device is determined, the storage extent being distributed over a plurality of storage devices of the RAID and including a first group of slices in the first storage device, the storage extent including a plurality of data blocks stored thereon. A portion of a data block of the plurality of data blocks is read from a first slice of the first group of slices, the first slice comprising the portion of the data block. The portion of the data block is written into a spare slice.

21 Claims, 7 Drawing Sheets

(56) References Cited

U.S. PATENT DOCUMENTS

| | | | |
|---|---|---|---|
| 10,289,336 B1* | 5/2019 | Liu | G06F 3/0619 |
| 10,346,247 B1* | 7/2019 | Gao | G06F 3/0689 |
| 10,958,434 B1* | 3/2021 | Marquardt | H04L 43/10 |
| 2003/0056142 A1* | 3/2003 | Hashemi | G06F 11/1084 |
| | | | 714/E11.089 |
| 2007/0248029 A1* | 10/2007 | Merkey | H04L 67/2804 |
| | | | 370/255 |
| 2007/0263444 A1* | 11/2007 | Gorobets | G11C 16/349 |
| | | | 365/185.09 |
| 2007/0266200 A1* | 11/2007 | Gorobets | G06F 11/008 |
| | | | 714/E11.02 |
| 2008/0082725 A1* | 4/2008 | Elhamias | G11C 29/76 |
| | | | 711/E12.008 |
| 2008/0082726 A1* | 4/2008 | Elhamias | G06F 12/0246 |
| | | | 711/115 |
| 2009/0138671 A1* | 5/2009 | Danilak | G06F 3/0659 |
| | | | 711/170 |
| 2009/0144516 A1* | 6/2009 | Sandorfi | G06F 3/0616 |
| | | | 711/E12.001 |
| 2010/0077252 A1* | 3/2010 | Siewert | G06F 11/008 |
| | | | 714/E11.029 |
| 2010/0122148 A1* | 5/2010 | Flynn | G11C 16/3422 |
| | | | 714/E11.034 |
| 2010/0195538 A1* | 8/2010 | Merkey | H04L 43/02 |
| | | | 370/255 |
| 2010/0250831 A1* | 9/2010 | O'Brien | G06F 11/3433 |
| | | | 711/170 |
| 2011/0231594 A1* | 9/2011 | Sugimoto | G06F 3/0688 |
| | | | 711/E12.008 |
| 2011/0302358 A1* | 12/2011 | Yu | G06F 11/108 |
| | | | 711/E12.008 |
| 2012/0203951 A1* | 8/2012 | Wood | G11C 29/42 |
| | | | 711/E12.008 |
| 2012/0278543 A1* | 11/2012 | Yu | G06F 3/0604 |
| | | | 711/E12.008 |
| 2014/0025770 A1* | 1/2014 | Warfield | G06F 16/134 |
| | | | 709/213 |
| 2014/0068158 A1* | 3/2014 | Cheng | G11C 29/82 |
| | | | 711/103 |
| 2014/0089565 A1* | 3/2014 | Lee | G06F 3/061 |
| | | | 711/103 |
| 2014/0122968 A1* | 5/2014 | Kazi | G06F 11/10 |
| | | | 714/763 |
| 2014/0173268 A1* | 6/2014 | Hashimoto | G06F 12/10 |
| | | | 713/2 |
| 2014/0359348 A1* | 12/2014 | Volvovski | G06F 11/3485 |
| | | | 709/224 |
| 2015/0067240 A1* | 3/2015 | Nozaki | G06F 11/3034 |
| | | | 711/103 |
| 2015/0199152 A1* | 7/2015 | Asnaashari | G06F 11/1076 |
| | | | 711/103 |
| 2015/0212937 A1* | 7/2015 | Stephens | G06F 3/0658 |
| | | | 711/103 |
| 2015/0324294 A1* | 11/2015 | Ogawa | G06F 12/0871 |
| | | | 711/118 |
| 2015/0347039 A1* | 12/2015 | Truong | G06F 3/0616 |
| | | | 711/103 |
| 2015/0378822 A1* | 12/2015 | Grube | G06F 3/067 |
| | | | 714/763 |
| 2016/0011782 A1* | 1/2016 | Kurotsuchi | G06F 3/064 |
| | | | 711/104 |
| 2016/0011818 A1* | 1/2016 | Hashimoto | G06F 3/0647 |
| | | | 711/103 |
| 2016/0019137 A1* | 1/2016 | Ellis | G06F 3/0679 |
| | | | 711/103 |
| 2016/0080490 A1* | 3/2016 | Verma | G06F 3/0607 |
| | | | 709/217 |
| 2016/0239390 A1* | 8/2016 | Myers | G06F 11/1662 |
| 2016/0246830 A1* | 8/2016 | Chiu | G06F 16/1734 |
| 2016/0292025 A1* | 10/2016 | Gupta | G06F 3/0688 |
| 2016/0299699 A1* | 10/2016 | Vanaraj | G06F 11/108 |
| 2017/0003891 A1* | 1/2017 | Arai | G06F 3/0653 |
| 2017/0077950 A1* | 3/2017 | Pavlov | H03M 13/05 |
| 2017/0090771 A1* | 3/2017 | Lin | G06F 3/065 |
| 2017/0149242 A1* | 5/2017 | Carson | H02J 7/0047 |
| 2017/0228158 A1* | 8/2017 | Kraemer | G06F 3/0689 |
| 2018/0011642 A1* | 1/2018 | Koseki | G06F 11/1076 |
| 2018/0018113 A1* | 1/2018 | Koseki | G06F 3/0619 |
| 2018/0084620 A1* | 3/2018 | Klein | B64D 47/06 |
| 2018/0088857 A1* | 3/2018 | Gao | G06F 3/0644 |
| 2018/0210782 A1* | 7/2018 | Gao | G06F 11/079 |
| 2018/0275894 A1* | 9/2018 | Yoshino | G06F 3/0689 |
| 2018/0336101 A1* | 11/2018 | Resch | G06F 3/0604 |
| 2019/0011283 A1* | 1/2019 | Soutar | H04L 69/06 |
| 2019/0034108 A1* | 1/2019 | Chang | H04L 67/1097 |
| 2019/0082010 A1* | 3/2019 | Friedman | G06F 11/1076 |
| 2019/0129797 A1* | 5/2019 | Ma | G06F 12/0246 |
| 2019/0129815 A1* | 5/2019 | Gao | G06F 3/0619 |
| 2019/0213803 A1* | 7/2019 | Ye | G06Q 10/20 |
| 2019/0220221 A1* | 7/2019 | Gao | G06F 3/065 |
| 2019/0332502 A1* | 10/2019 | Ma | G06F 11/008 |
| 2020/0026468 A1* | 1/2020 | Kang | G06F 3/0689 |
| 2020/0026469 A1* | 1/2020 | Gao | G06F 3/061 |
| 2020/0042380 A1* | 2/2020 | Roberts | G06F 3/0614 |
| 2020/0042390 A1* | 2/2020 | Roberts | G06F 11/2094 |
| 2020/0073818 A1* | 3/2020 | Inglis | G06F 3/064 |
| 2020/0133494 A1* | 4/2020 | Li | G06F 3/0653 |
| 2020/0133778 A1* | 4/2020 | Liu | G06F 11/1092 |

* cited by examiner

PROACTIVE COPY IN A STORAGE ENVIRONMENT

CROSS-REFERENCE TO RELATED APPLICATION(S)

This application claims priority to Chinese Patent Application No. CN201811251580.6, on file at the China National Intellectual Property Administration (CNIPA), having a filing date of Oct. 25, 2018, and having "A NEW EFFICIENT METHOD FOR MAPPER AND RAID TO IMPLEMENT PACO FOR TRIDENT" as a title, the contents and teachings of which are herein incorporated by reference in their entirety.

FIELD

Embodiments of the present disclosure generally relate to a storage system, and more specifically, to a method, a device and a computer readable storage medium for managing a Redundant Array of Independent Disks (RAID).

BACKGROUND

The RAID is a data storage virtualizing technique, which combines a plurality of physical storage devices into one or more logical units, for purposes of data redundancy, performance improvements and so on. If a product life of a storage device in the RAID is to be ended (EOL), it is probably required to replace online the storage device with other storage device. However, in some storage systems, replicating data from the storage device to the other storage device may involve too many write operations. This causes adverse impacts on the host I/O and wear of the storage device. Therefore, it is necessary to provide a solution at least partly solving the above problem.

SUMMARY

The embodiments of the present disclosure provide a method, a device and a computer program product for managing a RAID.

In a first aspect, there is provided a method of managing a RAID. The method includes: in response to receiving information indicative of an end-of-life (EOF) of a first storage device of the RAID, determining a storage extent associated with the first storage device, the storage extent being distributed over a plurality of storage devices of the RAID and including a first group of slices in the first storage device, the storage extent including a plurality of data blocks stored thereon; reading a portion of a data block of the plurality of data blocks from a first slice of the first group of slices, the first slice including the portion of the data block; and writing the portion of the data block into a spare slice.

In a second aspect, there is provided a device for managing a Redundant Array of Independent Disks (RAID), including: a processing unit; and a memory coupled to the processing unit and including instructions stored thereon, the instructions, when executed by the processing unit, causing the device to perform acts including: in response to receiving information indicative of an end-of-life (EOF) of a first storage device of the RAID, determining a storage extent associated with the first storage device, the storage extent being distributed over a plurality of storage devices of the RAID and including a first group of slices in the first storage device, the storage extent including a plurality of data blocks stored thereon; reading a portion of a data block of the plurality of data blocks from a first slice of the first group of slices, the first slice including the portion of the data block; and writing the portion of the data block into a spare slice.

In a third aspect, there is provided a computer-readable storage medium including machine-executable instructions stored thereon which, when executed by at least one processor, cause the at least one processor to perform the method according to the first aspect.

In a fourth aspect, there is provided a computer program product stored on a computer-readable medium and including machine-executable instructions which, when executed, cause a machine to perform the method according to the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference signs refer to the same elements.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred embodiments disclosed herein will be described in detail below with reference to the accompanying drawings. Although the drawings illustrate the preferred embodiments of the present disclosure, it would be appreciated that the present disclosure can be implemented in various forms but cannot be limited by the embodiments described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one other embodiment." The terms "first," "second," and the like may refer to different or same objects. Other definitions, explicit and implicit, may be included below.

Figure 1:
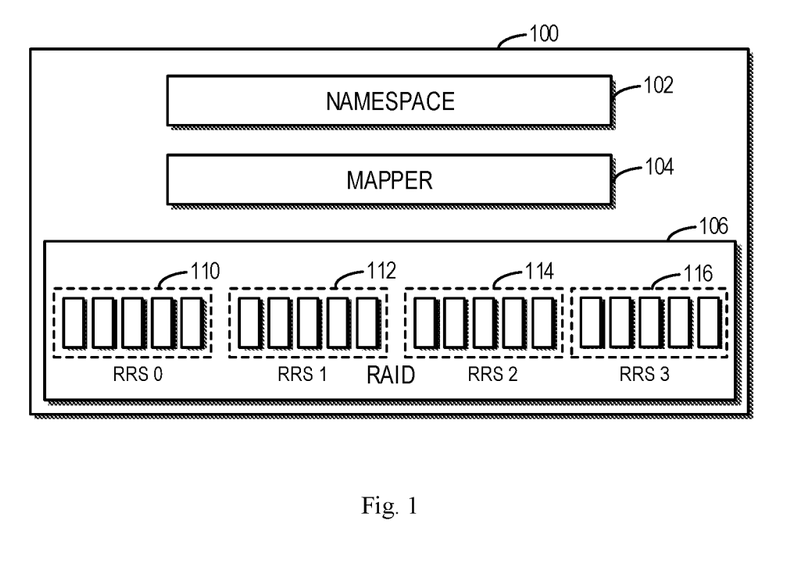
FIG. 1 illustrates a diagram of a node of a storage system according to some embodiments of the present disclosure.

FIG. 1 illustrates a diagram of a node 100 of a storage system according to some embodiments of the present disclosure. As shown in FIG. 1, the node 100 includes a namespace 102, a mapper 104, and a RAID 106.

In some embodiments, the namespace 102 supports a Network File System (NFA) and a Common Internet File System (CIFS), and is implemented on logical storage. The namespace 102 can communicate with the mapper 104, and obtain a physical address corresponding to a logical address using an Application Programming Interface (API) of the mapper 104. The mapper 104 includes mapping between the logical address and the physical address.

For example, the namespace 102 receives an input/output (I/O) request from a user, and sends the I/O request to the mapper 104. The mapper 104 searches an address of data and pushes the I/O request to the RAID 106. The RAID 106 uses a storage device (for example, a drive, a hard disk, or a Solid State Drive (SSD)) at the backend for executing I/O.

As shown in FIG. 1, the RAID 106 includes a plurality of sets 110, 112, 114 and 116, each of which can be referred to as RAID Recovery Set (RRS). Therefore, the plurality of sets 110, 112, 114 and 116 can also be represented as RRS0, RRS1, RRS2 and RRS3. Each set includes a plurality of storage device, such as hard disks, SSD or the like. It would be appreciated that any other appropriate storage device can be used, and the present disclosure is not limited herein. Each RRS is a fault tolerant domain, which means that, if a storage device within a RRS fails, reliability of other RRS will not be affected.

Figure 2:
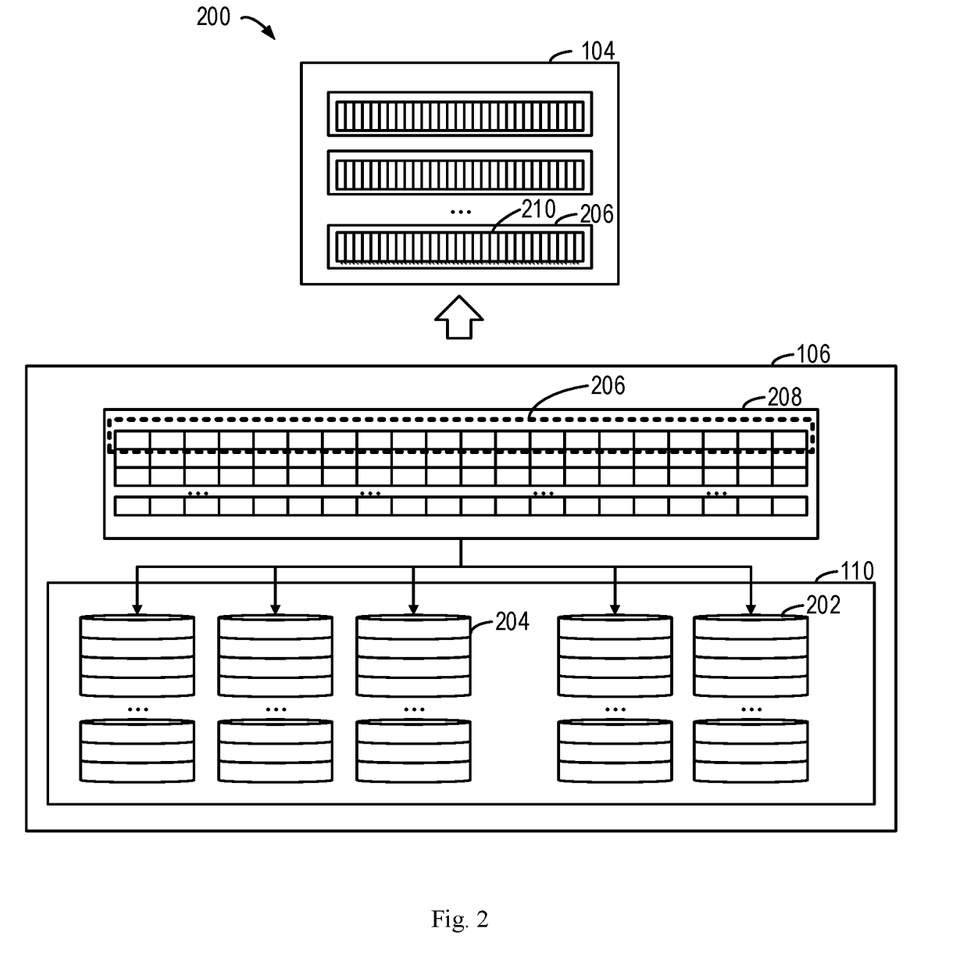
FIG. 2 illustrates a diagram of a part of a node according to some embodiments of the present disclosure.

FIG. 2 illustrates a diagram of a part 200 of a node 100 according to some embodiments of the present disclosure. As shown in FIG. 2, only one set 110 is shown in the RAID 106, and the set 110 includes a plurality of storage devices 202 each of which is partitioned into a plurality of slices 204. These slices can form a slice pool and can be allocated to a plurality of storage extents or RAID stripes, also referred to as ubers herein. An uber can be regarded as a conventional RAID. For example, if the RAID type is 4+1 RAID-5, in order to create an uber, it is required to allocate 5 slices for respective different storage devices and combine the five slices into a conventional RAID. For example, all slices within an uber can be from the same RRS.

As shown in FIG. 2, an uber pool 208 includes a plurality of ubers 206 each of which includes a plurality of slices. For example, an uber 206 can includes one or more slices from a storage device 202.

As shown in FIG. 2, the mapper 104 partitions the uber 206 into a plurality of data blocks 210, and a data block is the minimum unit for reading data from the uber 206, also referred to as Physical Largest Block (PLB) herein. Each of PLBs includes data on a plurality of slices on different storage devices. For example, a PLB of the 4+1 RAID-5 includes data from four slices and parity data from one slice and these slices belong to different storage devices, respectively.

FIGS. 1-2 illustrate diagrams of architecture according to some embodiments of the present disclosure; however, it would be appreciated that the embodiments of the present disclosure are also applicable to any other appropriate architecture, without departing from the spirit and principle of the present disclosure.

Figure 3:
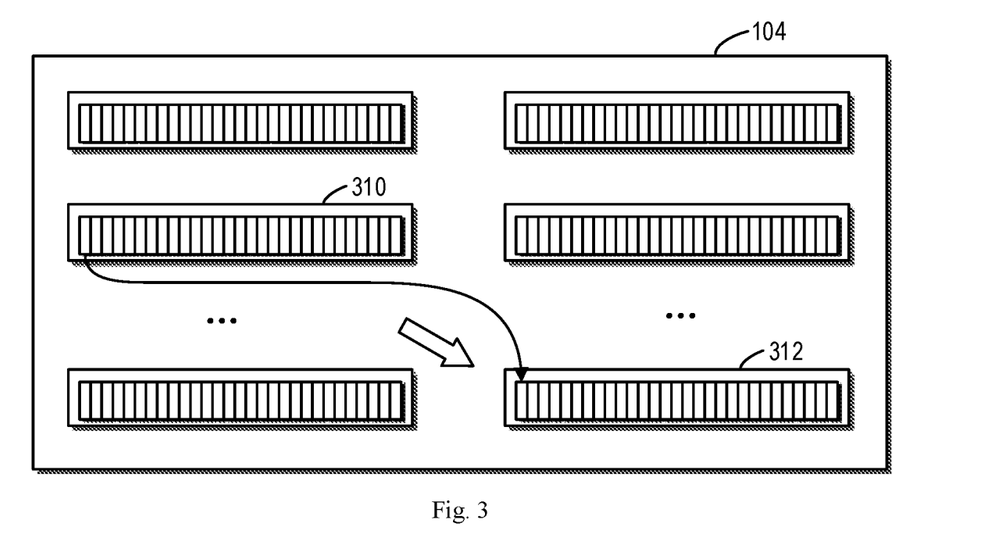
FIG. 3 illustrates a diagram of data migration according to the prior art.

If a storage device (for example, SSD) is approaching an End of Life (EOL), it is required to replicate data on the storage device to other storage devices. FIG. 3 illustrates a diagram of data migration according to the prior art. As shown in FIG. 3, if a life cycle of a storage device is going to end, the storage device will impact all ubers associated with the storage device. The mapper 104 will replicate all the impacted ubers to new ubers. For example, FIG. 3 illustrates replicating data of an impacted uber 310 to an uber 312. In the case, a data amount of internal data replication is a product of the RAID width and the size of the storage device. A great number of internal I/Os impact significantly the wear level of the storage device and the user I/O performance.

In order to at least partly solve the above problem, the embodiments of the present disclosure provide solutions of managing the RAIDs. These solutions will be described below in detail with reference to FIGS. 4-7.

Figure 4:
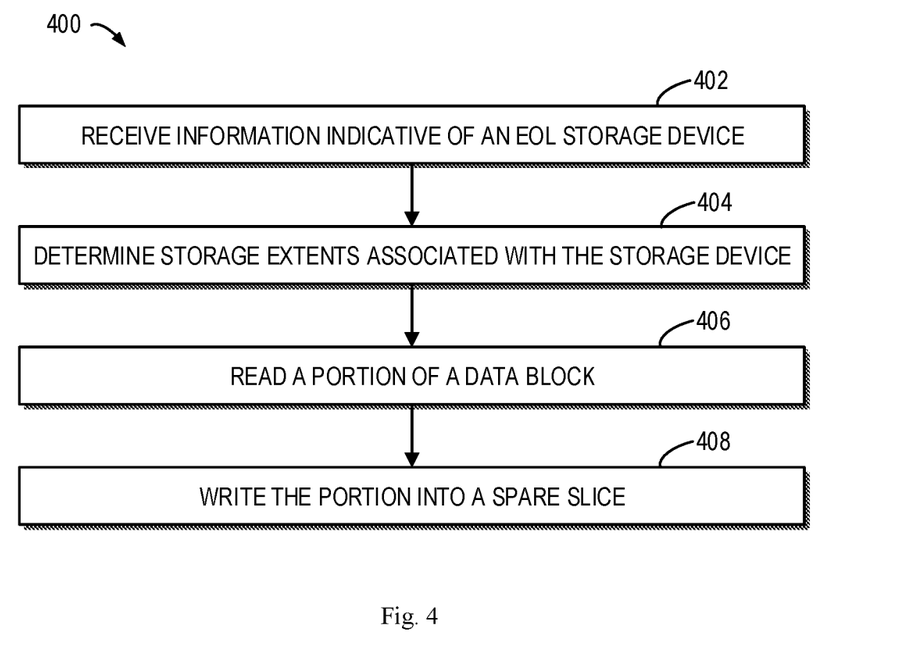
FIG. 4 illustrates a flowchart of a method of managing a RAID according to some embodiments of the present disclosure.
Figure 5A:
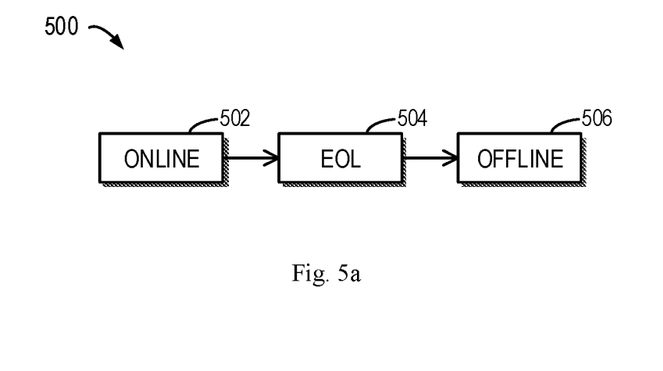
FIG. 5a illustrates a diagram of a state change of a storage device according to some embodiments of the present disclosure.

FIG. 4 illustrates a flowchart of a method 400 of managing a RAID according to some embodiments of the present disclosure. For example, the method 400 can be implemented at the mapper 104 and/or RAID 106. FIG. 5a illustrates a diagram of a state change of a storage device according to some embodiments of the present disclosure. For example, a storage device may be configured in an online state 502. After a period of time, due to wear or the like, the life cycle of the storage device is probably to be ended, i.e., approaching an EOL state 504. After implementing some methods according to embodiments of the present disclosure, for example, the method 400, the storage device can go offline, and thus will be configured in an offline state 506.

Figure 5B:
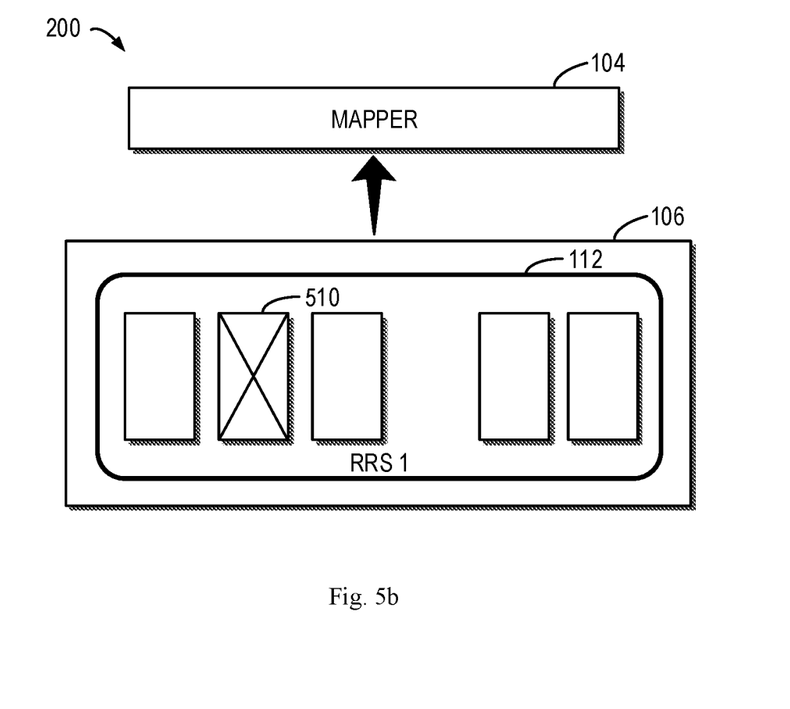
FIG. 5b illustrates a diagram of notifying a state change of a storage device according to some embodiments of the present disclosure.

At block 402, the mapper 104 receives information indicative of an end of life (EOF) of a storage device 510 of the RAID 106. FIG. 5b illustrates a diagram of receiving EOL information according to some embodiments of the present disclosure. The RAID 106 includes a mechanism of detecting a health condition of a storage device (for example, SSD). For example, if an error count or erase count of an SSD is greater than a threshold, the RAID 106 changes the state of the SSD from the healthy state to the EOL state. When the RAID 106 detects that the SSD is breaking down, the RAID 106 sends a notification to the mapper 104 to notify the mapper 104 which SSD will fail. As shown in FIG. 5b, the EOF of the storage system 510 of the RAID 106 is approaching, and as a result, the RAID 106 notifies, via an interface between the RAID 106 and the mapper 104, the mapper 104 that the EOF of the storage device 510 is approaching.

At block 404, a storage extent associated with the storage device 510 is determined. The storage extent can be an uber as described above, which is distributed over a plurality of storage devices 202 of the RAID 510 and includes a first set of slices in the storage device 510. A set of slices can include one or more slices. The storage extent stores a plurality of data blocks, and for example, an uber stores a plurality of PLBs. For example, all storages extents or ubers including any slice of the storage device 510 can be determined.

Figure 6:
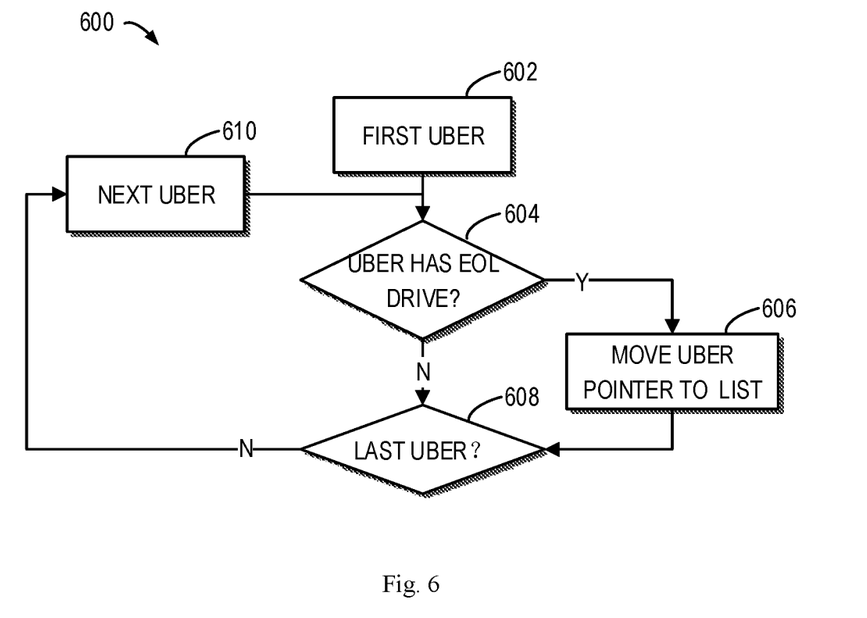
FIG. 6 illustrates a flowchart of a method of determining an impacted storage extent according to some embodiments of the present disclosure.

FIG. 6 illustrates a flowchart of a method 600 of determining an impacted storage extent or uber according to some embodiments of the present disclosure. For example, the mapper 104 can iterate all ubers consumed by the mapper 104 to determine which ubers include slices of the EOL storage, and place these ubers in an uber_paco_list. For convenience, the storage device can also be referred to as a drive or a disk.

At block 602, a first uber is selected. At block 604, it is determined whether the uber includes a slice of the EOL storage device. If yes, the method proceeds to block 606, and the pointer of the uber is moved to the list uber_paco_list. Then, the method 600 proceeds to block 608 where it is determined whether the uber is the last one. If it is not the last uber, the method proceeds to block 610, and the mapper 104 moves to the next uber for executing a next iteration. In addition, if it is determined at 604 that the uber does not include a slice of the EOL storage device, the method 600 proceeds to block 608.

Now returning to FIG. 4, at block 406, a portion of one of the plurality of data blocks is read from a first one of the first set of slices. The first slice includes the portion of the data block. For example, if a portion of a data block (for example, PLB) in the uber is stored in the first slice, the portion of PLB is read from the first slice.

At block 408, the portion of the data block is written into a spare slice. When obtaining the uber_paco_list, the mapper 104 can select an uber each time and cooperate with the RAID 106 to replicate the data from the EOL drive to the spare slice. When copying an uber is completed, the mapper 104 sends an uber recovery message to the RAID 106 to modify the metadata of the uber, thereby replacing the EOL disk slice with the spare slice. After all ubers in the uber_paco_list are recovered, the mapper sends a proactive copy (PACO) recovery message to the RAID 106, such that the RAID 106 marks the EOL disk offline.

For example, the uber determined at block 404 includes the RAID 106 or the second set of slices in the second storage device in the RRS 1. In some embodiments, the second storage device can also refer to a plurality of storage devices in the RAID 106 or RRS 1, other than the first storage device, for example, all of the other storage devices. For example, if it is determined that the second set of slices include a first spare slice, the portion of the PLB is written into the first spare slice. If the second set of slices does not include a spare slice, a second spare slice is selected from slices in the second storage device, other than the second set of slices, as a portion of the storage extent, and the portion of the data block is written into the second spare slice. For example, the second spare slice can be selected for any storage device from the other storage devices.

In some embodiments, if respective portions of the plurality of data blocks or PLBs are all written into respective spare slices, the first slice is replaced with the spare slice. For other data blocks or PLBs, other spare slices can be used to replace respective first slices. In some embodiments, if respective portions of the plurality of data blocks or PLBs in all the storage extents or ubers associated with the EOL storage device are written into respective spare slices, the EOL device can go offline.

By reducing a number of I/Os, a loss level of a storage device (for example, SSD) is decreased. Taking the 4+1 RAID 5 as an example, the method as shown in FIG. 3 replicates quintuple EOL disk data. In comparison, it is required in the embodiments of the present disclosure to replicate only the EOL disk data, which is 25% of the data in the method as shown in FIG. 3. In additional, online replacement of the storage device (for example, SSD) reduces the impact on the host I/O. Moreover, since the embodiments of the present disclosure only utilize a read lock for the PLB and the mapper can flush the host data to one or more new PLBs, the host I/Os will not be congested.

Figure 7:
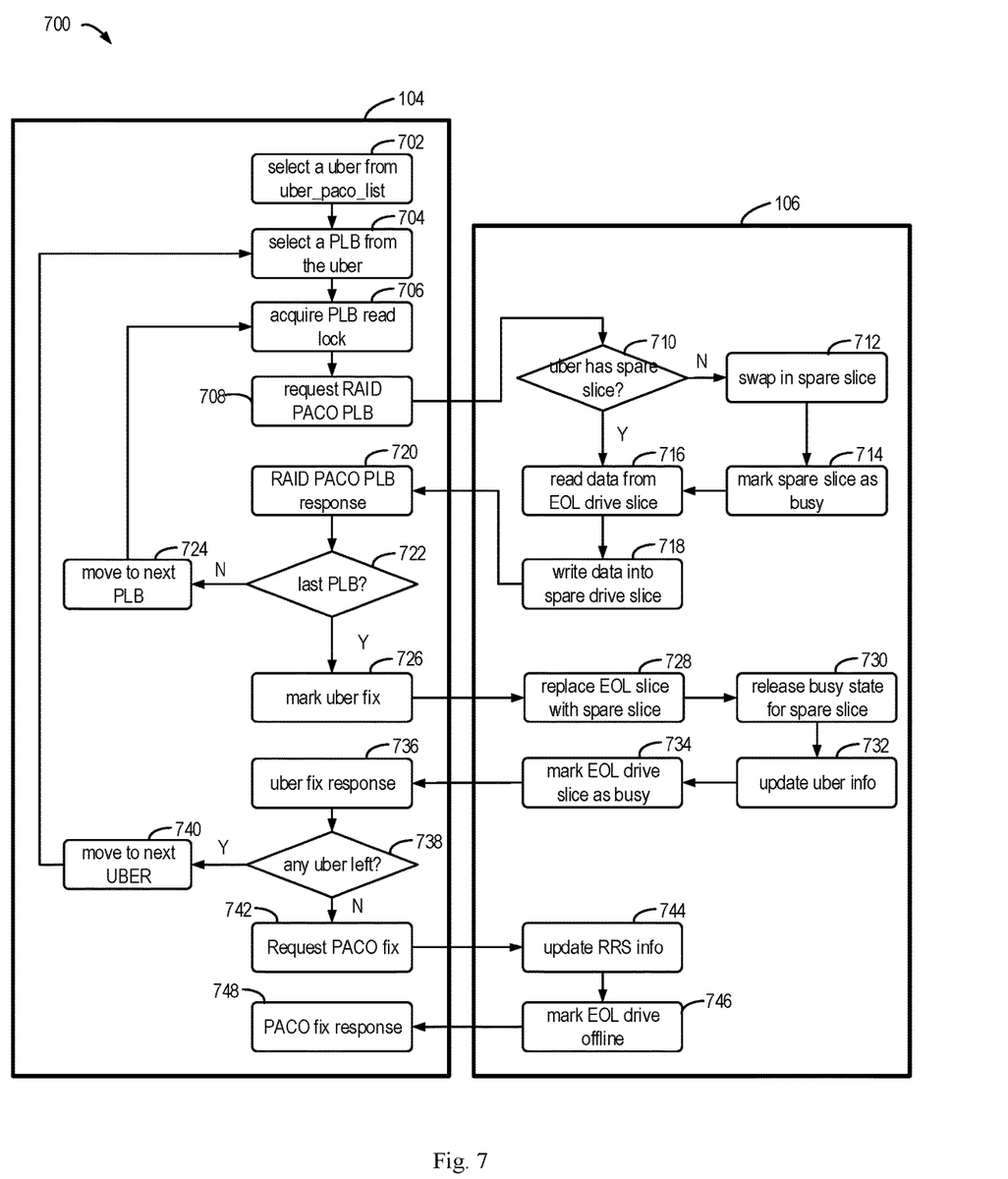
FIG. 7 illustrates a flowchart of a method of managing a RAID according to some embodiments of the present disclosure.

FIG. 7 illustrates a flowchart of a method 700 of managing a RAID according to some embodiments of the present disclosure. At block 702, the mapper 104 selects a first uber from the uber_paco_list which can be a list determined by the method 600. For example, the mapper 104 can find all ubers associated with EOL drives, and these ubers are placed in the uber_paco_list. At block 704, the mapper 104 selects a first PLB from the first uber. At block 706, the mapper 104 obtains a read lock of the PLB, such that the PLB can be read but does not allow write. At block 708, the mapper 104 sends a request to the RAID 106, to request the RAID 106 to start replicating data from the old drive to the spare space in the new drive, which is also referred to as Proactive Copy (PACO). In the process, the mapper 104 can send the identifier (ID) of the uber and the identifier (or serial number) of the PLB to the RAID 106. At block 710, the RAID 106 checks whether there is a spare slice on the uber, which is also referred to as spare drive slice. If yes, the method proceeds to block 716. If not, the method 700 proceeds to block 712. At block 712, a new spare slice is swapped in, which can be from any other drive in the RAID 106, or any other drive in respective RRS. At block 714, the spare slice can be marked busy to prevent access thereto. At block 716, data are read from the EOL drive slice. At block 718, the RAID 106 writes data into the spare slice. Then, the RAID 106 sends a response indicative of completion of copying the PLB to the mapper 104.

At block 720, the mapper 104 receives a PACO PLB response and releases the read lock of the PLB, and the method proceeds to block 722. At block 722, the mapper 104 determines whether the PLB is the last one in the uber. If not, the mapper 104 moves to the next PLB at block 724, and the method proceeds to block 706 for the next iteration.

If it is determined at block 722 that the PLB is the last one in the uber, processing of the uber has been completed, and the method 700 proceeds to the block 726. At block 726, the mapper 104 marks the uber as being recovered, and sends the identifier (ID) of the uber to the RAID 106. At block 728, the RAID 106 replaces the EOL drive slice with the spare slice. At block 730, the RAID 106 releases the busy state of the spare slice, and access thereto is permitted. For example, the uber information can indicate information for the storage devices and slices forming the uber. At block 734, the RAID 106 marks the EOL disk slice busy to prevent access to the EOL disk slice. Moreover, the RAID 106 sends a response indicative of uber recovery completion to block 736. At block 736, the mapper 104 receives the response indicative of uber recovery completion. At block 738, the mapper 104 determines whether there is any uber left in the uber_paco_list that has been not processed. If yes, the method 700 proceeds to block 740 where the mapper 104 moves to the next uber for iteration. If no, the method 700 proceeds to block 742 where the mapper 104 requests the RAID 106 to execute PACO recovery, and sends the disk ID of the EOL disk to the RAID 106, for replacing the old disk with a new one. At block 744, the RAID 106 updates the RRS information, and at block 746, the EOL disk is marked offline, and a response indicative of PACO recovery completion is sent. At block 748, the mapper 104 receives the response indicative of PACO recovery completion and acknowledges recovery completion.

Figure 8:
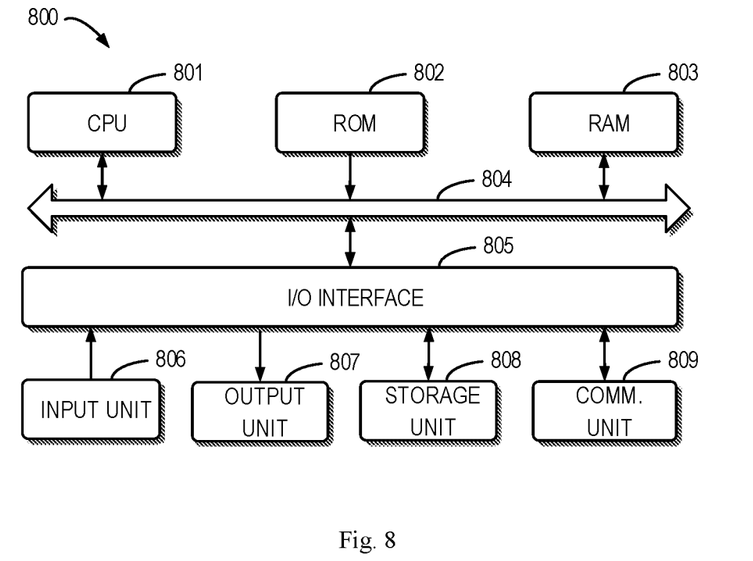
FIG. 8 illustrates a block diagram of an example device that can be used to implement embodiments of the present disclosure.

FIG. 8 illustrates an example device 800 that can implement embodiments of the present disclosure. As shown, the device 800 includes a central processing unit (CPU) 801 that can perform various appropriate acts and processing based on computer program instructions stored in a read-only memory (ROM) 802 or computer program instructions loaded from a storage unit 808 to a random access memory (RAM) 803. In the RAM 803, there further store various programs and data needed for operations of the device 800. The CPU 801, ROM 802 and RAM 803 are connected to each other via a bus 804. An input/output (I/O) interface 805 is also connected to the bus 804.

The following components in the device 800 are connected to the I/O interface 805: an input unit 806, such as a keyboard, a mouse and the like; an output unit 807, such as various kinds of displays and a loudspeaker, etc.; a storage unit 808, such as a magnetic disk, an optical disk, and etc.; a communication unit 809, such as a network card, a modem, and a wireless communication transceiver, etc. The communication unit 809 allows the device 800 to exchange information/data with other devices through a computer network such as the Internet and/or various kinds of telecommunications networks.

Various processes and processing described above, e.g., the methods 400, 600 and 700, can be executed by the processing unit 801. For example, in some embodiments, the methods 400, 600 and 700 can be implemented as a computer software program that is tangibly embodied on a machine readable medium, e.g., the storage unit 808. In some embodiments, part or all of the computer programs can be loaded and/or mounted onto the device 800 via ROM 802 and/or communication unit 808. When the computer program is loaded to the RAM 803 and executed by the CPU 801, one or more steps of the methods 400, 600 and 700 as described above can be executed.

The present disclosure can be a method, a device, a system and/or a computer program product. The computer program product can include a computer readable storage medium on which computer readable program instructions are carried out for performing each aspect of the present application.

The computer readable medium may be a tangible medium that may contain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium would include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It would be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means (or specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing a Redundant Array of Independent Disks (RAID), comprising:
   receiving, by a mapper within a node of a storage system, wherein the node includes both the mapper and the RAID, wherein the mapper includes mapping between at least one logical address and at least one physical address, information indicative of at least one end-of-life (EOL) storage device within the RAID, wherein the at least one EOL storage device includes a first storage device;
   in response to receipt, by the mapper from the RAID, of the information indicative of the at least one EOL storage device,
      finding, by the mapper, all storage extents in the storage system that each individually include one of a plurality of slices located in the at least one EOL storage device, wherein each storage extent comprises a RAID stripe, and
      placing, by the mapper, all the storage extents in the storage system that each individually include one of the plurality of slices located in the at least one EOL storage device into a list;
   selecting, by the mapper from the list, a storage extent that includes one of a plurality of slices located in the first storage device, the storage extent being distributed over a plurality of storage devices of the RAID and comprising a first group of slices in the first storage device, the storage extent comprising a plurality of data blocks stored thereon;
   obtaining a read lock on a data block of the plurality of data blocks that allows the data block to be read and prevents the data block from being written;
   reading a portion of the data block from a first slice of the first group of slices, the first slice comprising the portion of the data block;
   writing the portion of the data block into a spare slice; and
   in response to completion of the writing of the portion of the data block into the spare slice, releasing the read lock on the data block.

2. The method of claim 1, wherein the storage extent further comprises a second group of slices in a second storage device of the plurality of storage devices, and wherein writing the portion of the data block into the spare slice comprises:
   in response to determining that the second group of slices comprise a first spare slice, writing the portion of the data block into the first spare slice.

3. The method of claim 2, wherein writing the portion of the data block into the spare slice comprises:
   in response to determining that the second group of slices comprise no spare slices, selecting, for a portion of the storage extent, a second spare slice other than the second group of slices from the second storage device; and
   writing the portion of the data block into the second spare slice.

4. The method of claim 1, further comprising:
   in response to respective portions of the plurality of data blocks being written into respective spare slices, replacing the first slice with the spare slice.

5. The method of claim 1, further comprising:
   in response to respective portions of data blocks in each of the storage extents associated with the first storage device being written into respective spare slices, causing the first storage device offline.

6. A device for managing a Redundant Array of Independent Disks (RAID), comprising:
   a processing unit; and
   a memory coupled to the processing unit and comprising instructions stored thereon, the instructions, when executed by the processing unit, causing the device to perform acts comprising:
      receiving, by a mapper within a node of a storage system, wherein the node includes both the mapper and the RAID, wherein the mapper includes mapping between at least one logical address and at least one physical address, information indicative of at least one end-of-life (EOL) storage device within the RAID, wherein the at least one EOL storage device includes a first storage device;

in response to receipt, by the mapper from the RAID, of the information indicative of the at least one EOL storage device, finding, by the mapper, all storage extents in the storage system that each individually include one of a plurality of slices located in the at least one EOL storage device, wherein each storage extent comprises a RAID stripe, and placing, by the mapper, all the storage extents in the storage system that each individually include one of the plurality of slices located in the at least one EOL storage device into a list;

selecting, by the mapper from the list, a storage extent that includes one of a plurality of slices located in the first storage device, the storage extent being distributed over a plurality of storage devices of the RAID and comprising a first group of slices in the first storage device, the storage extent comprising a plurality of data blocks stored thereon;

obtaining a read lock on a data block of the plurality of data blocks that allows the data block to be read and prevents the data block from being written;

reading a portion of the data block from a first slice of the first group of slices, the first slice comprising the portion of the data block;

writing the portion of the data block into a spare slice; and in response to completion of the writing of the portion of the data block into the spare slice, releasing the read lock on the data block.

7. The device of claim 6, wherein the storage extent further comprises a second group of slices in a second storage device of the plurality of storage devices, and wherein writing the portion of the data block into the spare slice comprises:

in response to determining that the second group of slices comprise a first spare slice, writing the portion of the data block into the first spare slice.

8. The device of claim 7, wherein writing the portion of the data block into the spare slice comprises:

in response to determining that the second group of slices comprise no spare slices, selecting, for a portion of the storage extent, a second spare slice other than the second group of slices from the second storage device; and writing the portion of the data block into the second spare slice.

9. The device of claim 6, wherein the acts further comprise:

in response to respective portions of the plurality of data blocks being written into respective spare slices, replacing the first slice with the spare slice.

10. The device of claim 6, wherein the acts further comprise:

in response to respective portions of data blocks in each of the storage extents associated with the first storage device being written into respective spare slices, causing the first storage device offline.

11. A computer program product having a non-transitory computer readable medium which stores a set of instructions to manage a Redundant Array of Independent Disks (RAID); the set of instructions, when carried out by computerized circuitry, causing the computerized circuitry to perform a method of:

receiving, by a mapper within a node of a storage system, wherein the node includes both the mapper and the RAID, wherein the mapper includes mapping between at least one logical address and at least one physical address, information indicative of at least one end-of-life (EOL) storage device within the RAID, wherein the at least one EOL storage device includes a first storage device;

in response to receipt, by the mapper from the RAID, of the information indicative of the at least one EOL storage device, finding, by the mapper, all storage extents in the storage system that each individually include one of a plurality of slices located in the at least one EOL storage device, wherein each storage extent comprises a RAID stripe, and placing, by the mapper, all the storage extents in the storage system that each individually include one of the plurality of slices located in the at least one EOL storage device into a list;

selecting, by the mapper from the list, a storage extent that includes one of a plurality of slices located in the first storage device, the storage extent being distributed over a plurality of storage devices of the RAID and comprising a first group of slices in the first storage device, the storage extent comprising a plurality of data blocks stored thereon;

obtaining a read lock on a data block of the plurality of data blocks that allows the data block to be read and prevents the data block from being written;

reading a portion of the data block from a first slice of the first group of slices, the first slice comprising the portion of the data block;

writing the portion of the data block into a spare slice; and in response to completion of the writing of the portion of the data block into the spare slice, releasing the read lock on the data block.

12. The method of claim 1, wherein the read lock on the data block is obtained by the mapper prior to reading of the portion of the data block from the first slice; and wherein the read lock on the data block is released by the mapper in response to an indication received by the mapper from the RAID that writing of the portion of the data block into the spare slice by the RAID is complete.

13. The method of claim 12, wherein the portion of the data block comprises the whole data block.

14. The method of claim 12, further comprising:

after the read lock is obtained by the mapper, sending, by the mapper, a request to the RAID that requests the RAID to start replicating data from the first storage device to the spare slice; and wherein the reading of the portion of the data block from the first group of slices and the writing of the portion of the data block into the spare slice are performed by the RAID in response to the request sent by the RAID.

15. The method of claim 14, further comprising:

wherein the mapper, while sending the request to the RAID, sends an identifier of the storage extent and an identifier of the data block to the RAID.

16. The method of claim 1, wherein the mapper selects the data block from the plurality data blocks responsive to the storage extent associated with the first storage device being located first in the list.

17. The method of claim 16, wherein the at least one EOL storage device comprises a plurality of EOL storage devices contained within the RAID.

18. The method of claim 1, wherein each one of the plurality of data blocks comprises a minimum unit for reading data from the RAID stripe.

19. The method of claim 1, wherein each one of the plurality of data blocks includes data stored on multiple slices located on different ones of storage devices in the plurality of storage devices.

20. The method of claim 1, further comprising:
   marking, by the RAID, the spare slice as busy while portions of multiple ones of the plurality of data blocks in the storage extent are written into the spare slice.

21. The method of claim 1, wherein the at least one EOL storage device comprises a plurality of EOL storage devices, and further comprising:
   partitioning each one of the plurality of storage devices of the RAID into a plurality of slices; and
   wherein finding all storage extents in the storage system that each individually include one of the plurality of slices located in the at least one EOL storage device includes iterating over each one of a plurality of storage extents consumed by the mapper from the RAID to determine which ones of the storage extents consumed by the mapper from the RAID include one of the plurality of slices located in the plurality of EOL storage devices.

* * * * *